United States Patent Office 3,135,739
Patented June 2, 1964

3,135,739
ETHERIFYING GRANULE STARCH IN ALIPHATIC KETONE SOLVENT MEDIUM
Erling T. Hjermstad, Cedar Rapids, and Larry C. Martin, Alburnett, Iowa, assignors to Penick & Ford, Ltd. Incorporated, Cedar Rapids, Iowa, a corporation of Delaware
No Drawing. Filed Aug. 21, 1961, Ser. No. 132,532
7 Claims. (Cl. 260—233.3)

This invention relates to a method of producing starch ethers in the ungelatinized granule state. The method is particularly adapted for producing highly substituted starch ethers without swelling the starch product to the degree that the granules coalesce and form a gummy mass.

The etherification of starch to modify its properties is a procedure widely used in the starch industry, and for a number of years has been carried out in connection with large scale commercial production. In the standard process, native granule starch is suspended in water, and the etherification reaction is terminated before the starch is swollen to an unfilterable condition. For large scale commercial production, it is virtually essential that the etherified starch be recoverable by filtration, since otherwise the dewatering of the starch is a time consuming and expensive operation. The use of water as a reaction medium, however, imposes a rather severe limitation on the degree of etherification if the product is to be obtained in a filterable state. It is difficult to substitute more than 0.1 ether groups per anhydroglucose unit ($C_6H_{10}O_5$ mole) of starch without swelling the product to an unfilterable state, especially under the alkaline and temperature conditions required for efficient etherification.

There has long been a need for an economical and efficient process by which more highly substituted starch ethers can be produced in large scale commercial operations. This need has become more imperative in recent years because of the recognition that highly substituted starch ethers are less of a hazard in connection with river and lake pollution.

An important application of etherified starch is in its use as a size for textile warp yarns. Starches and modified starches have been used for many years to size warp yarns in order to give them greater strength and resistance to abrasion during weaving. The size is removed from the woven cloth and often discarded by discharging into rivers and streams. Ordinary starch is subject to rapid bacterial decomposition and this can result in a lowering of the oxygen content in rivers to the point where fish and the organisms they feed on cannot survive. Extreme pollution with organic material results in replacement of clean water forms of life with pollution tolerant forms such as maggots, sludge worms, leeches, blue green algae, and various molds and bacteria. The water is often turbid and malodorous under these conditions.

The capacity of a substance to cause depletion of oxygen when discharged in a stream is proportional to its biochemical oxygen demand. The biochemical oxygen demand (B.O.D.) of sewage, sewage effluents, or industrial wastes is the quantity of dissolved oxygen required during stabilization of the decomposable organic matter by aerobic biochemical action. Determination of this quantity is accomplished by diluting suitable portions of the sample with water saturated with oxygen and measuring the dissolved oxygen before and after a period of incubation, usually 5 days at 25° C., with suitable bacteria present. Unsubstituted starch exhibits a relatively high B.O.D. within a 5 day incubation period at 25° C. Starch which is etherified to increasing degrees of substitution exhibits a decreasing 5 day B.O.D. value. For example, with an average substitution of about 1 hydroxyethyl group per anhydroglucose unit of starch 5 day B.O.D. values in the order of one tenth of that of unsubstituted starch have been obtained. Other types of substituted groups also result in lowered B.O.D. values.

Summarizing, it is the principal object of the present invention to provide an economical and efficient process for producing more highly substituted starch ethers in the ungelatinized, granule state. More specifically, it is an object of the present invention to provide a process of this character in which the etherification reaction is carried out in a liquid reaction medium, and in which the overall process is adapted for large scale commercial operations. Another specific object is to provide a process which is capable of producing very highly substituted starch ethers exhibiting markedly decreased B.O.D. values. Further objects and advantages will be indicated in the following detailed specification.

In practicing the method of the present invention, unswollen granule starch is suspended in a ketone reaction medium. The ketone should be an aliphatic ketone containing less than 6 carbon atoms, such as acetone, methyl ethyl ketone, diethyl ketone, and methyl propyl ketone. The preferred ketones are acetone and methyl ethyl ketone, which contain less than 5 carbon atoms.

The reaction system should also contain water. The proportion of the water in relation to the starch is of importance. As previously indicated, it is desired to provide a reaction medium which promotes the etherification reaction without at the same time tending to swell the starch to an unfilterable condition. While the optimum proportions of the water and the ketone will vary somewhat with the particular etherifying agent, the extent of etherification, and the other conditions of the reaction, it can be stated generally that the reaction system should contain from 5 to 40% of water based on the dry weight of the starch. For most reactions, the preferred proportions will range from 20 to 35 parts of water per 100 parts by weight of the starch.

The reaction medium of the present invention can be used with high solids starch suspensions. Preferably, from 1 to 3 parts by weight of the ketone are employed per part of starch. The fluidity of the suspension should be maintained throughout the reaction. Consequently, when substituting to a high level such as a 25 to 50% increase in weight, it may be desirable to start with a lower initial concentration of starch in the reaction medium, or to add more ketone to the suspension during the reaction to maintain a fluid suspension as the starch gains in weight.

The etherifying agents which may be used include any type of organic etherifying agent which reacts monofunctionally with alkaline starch to produce partial ethers. For example, the reacting group may be an epoxy group, a halogen atom such as chlorine, a sulfate group, etc. Included are the following: mono epoxy alkanes or mono epoxyalkanes containing other functional groups which are not reactive to alkaline starch, for example, ethylene oxide, propylene oxide, butylene oxide, 1,2 epoxy butene, styrene oxide, dialkylamino propylene oxide, 1,2 epoxy-3 phenoxy propane and other mono epoxides containing an oxygen linked to adjacent carbon atoms; mono-halogen substituted alkanes, alkenes, or alkynes or mono-halogen substituted alkanes containing other functional groups which are not reactive to alkaline starch, for example, methyl chloride or bromide and higher homologs, allyl and methallyl chloride or bromide, propargyl chloride or bromide, benzyl chloride or bromide, sodium monochloracetate, sodium monochlorpropionate, dialkyl amino ethyl chloride, monohalo-hydrins and other mono-halogen substituted reagents; alkyl sulfates, for example, dimethyl and diethyl sulfate; and unsaturated compounds capable of reacting monofunctionally with the hydroxyl groups of starch by 1–4 addition, for example acrylonitrile, acrylamide, or acrylate esters.

The method of preparing the suspension from ketone, starch, alkali and water is of importance. Alkali solutions do not mix with ketones and some of the ketones have low water solubility. It is, therefore, most desirable to have vigorous agitation during the addition or dissolving of NaOH, otherwise the aqueous NaOH solution will collect as a layer on the bottom and cause partial gelatinization of the starch. However, after the alkali is dissolved and distributed on the starch, the system is stable and separation does not occur, even without agitation. It is desirable to attain a high degree of uniformity of distribution of alkali and water on the starch. Uneven distribution can cause uneven etherification which results in some of the starch being substituted to the ketone soluble state while some is very slightly substituted. This may cause the product to be gummy and unfilterable. The preferred method of preparation is as follows: unswollen, native granule starch in the powdered form and containing the normal, commercial moisture (5–15%) is suspended in ketone and an aqueous NaOH solution containing the desired proportions of alkali and water is added slowly while agitating the suspension vigorously. Another method is to suspend the starch in the ketone, add NaOH flakes or pellets and agitate the suspension vigorously while adding the desired proportion of water slowly.

It will be understood that the optimum proportion of alkali to bring the etherification reaction to completion will depend somewhat on the particular kind of etherifying agent. For example, the organic epoxide etherifying agents require less alkali because they are highly reactive, and because they do not consume alkali as they react.

In the present process from 0.1% to 5.0% of NaOH, KOH, or equivalent alkali reagent based on starch solids may be used when etherifying with epoxides. Quaternary ammonium hydroxides such as tetra methyl ammonium hydroxide can also be used. However, it is preferred to use from 1.5–2.5% of the alkali based on starch solids in order to achieve reasonable reaction rates and moderate proportions of salt in the neutralized product. Reactions of starch with unsaturated compounds by 1–4 addition to the hydroxyl groups require conditions of alkalinity similar to those of epoxide reactions. Etherifying agents such as mono-halogen substituted compounds and alkyl sulfates consume alkali as the reagent hydrolyzes. Therefore the total amount of alkali present during etherifications with these reagents should be at least sufficient to provide for complete hydrolysis. It is also necessary to provide an excess of alkali to carry such reactions to completion. In the present process the use of an excess of NaOH or equivalent alkali of 1.0%–3% based on starch solids is preferred, though higher excess proportions may be used.

The desired proportions of etherifying agent and alkali may be added to the starch suspension either all at once or in separate increments. When using hydrolyzable etherifying reagents the alkali may be added in separate increments to avoid extreme proportions of alkali to starch before it is consumed by the etherifying agent.

The temperature at which the etherifications can be conducted can vary widely, though higher rates of reaction are obtained as the temperature is raised. Some starches tend to turn brown when reacted at high temperature with alkalis, especially starches which have been depolymerized by acids or oxidizing agents. It is therefore desirable to maintain reaction temperatures which do not have an adverse effect on the product. In general, it is preferred to maintain reaction temperatures within the range of 70° F.–150° F., though higher and lower temperatures may be used depending on the type of starch, the ketone used, the type of etherifying agent and the degree of ether group substitution which is sought. In any case, temperatures which are low enough to prevent browning of the starch product and formation of gummy, unfilterable products are desired.

When the desired proportion of etherifying agent has been reacted the etherified starch may be left in the alkaline state or neutralized with acid. The product may be separated from the ketone by simple filtration followed by evaporation, and this procedure is preferred. As an alternative, the ketone may be totally evaporated from the suspension and condensed for reuse. The excess water remaining in the product can be removed by normal drying methods. With either procedure, the process is economical, since almost all of the acetone can be recovered and used over and over again.

Any type of starch in the native, ungelatinized granule form may be used in the process. Included are modified starches and dextrins which retain the native, ungelatinized granule form, such as acid-modified thin-boiling starches, oxidized starches, bleached starches, high and low soluble dextrins, and British gums. We also include any variety of native granule starch such as corn starch, wheat starch, potato starch, tapioca starch, waxy maize starch, sorghum starch, and starches having a high proportion of the amylose fraction in either the unmodified or modified state.

A very wide variety of different types of starch ethers with varying degrees of ether groups substitutions may be prepared by our process. The introduction of hydrophilic ether groups increases the affinity of the starch for water and results in lowered starch gelatinization temperature, increased rate of granule dispersion when gelatinized, greater clarity and paste cohesiveness and lowered tendency of pastes to gel and retrograde on cooling and aging. Film clarity, smoothness and flexibility are improved. The monofunctional substitution of higher proportions of hydrophilic ether groups in ungelatinized starch results in a lowering of gelatinization temperature. Ungelatinized starches containing less than 1 hydroxyethyl group or sodium carboxymethyl group per $C_6H_{10}O_5$ unit of starch and which gelatinize instantly when added to cold water can be made by our process. These products may be used as thickeners or adhesives in various commercial applications, for example, printing pastes, well drilling fluids, textile and paper sizes, etc.

Other special properties can be introduced in ungelatinized starch by selection of the proper etherifying agent. Cyclic or aromatic groups can be introduced by reacting compounds having monochlorine or epoxidized side chains. Unsaturated groups can be added with reagents such as allyl or propargyl chloride. Anionic activity can be induced by introduction of groups containing carboxyl, phosphate, or sulfonate radicals. Cationic activity can be obtained by the introduction of amino or substituted amino groups.

The process of the present invention permits starch ethers to be prepared containing far in excess of .1 ether group per anhydroglucose unit. For example, the reaction may be continued until the starch contains in excess of .5 ether groups per anhydroglucose unit. It will be understood that these refer to average substitution values, and that the ether groups will be distributed on a random basis. In one preferred embodiment, the process is employed to produce very highly substituted starches containing from .9 to 1.6 ether group per anhydroglucose unit. The maximum possible degree of substitution while maintaining the starch in the unswollen granule state has not been determined. It is believed, however, that the process can be used for preparing starches containing up to 2.5 ether groups per anhydroglucose unit. The substitution of high proportions of ether groups becomes more difficult with increasing molecular weight of the substituent groups. For substitutions above .9 ether group per anhydroglucose unit it is therefore preferred to use ether groups containing less than 4 carbon atoms. As previously indicated, such highly substituted starch ethers have very low B.O.D.

values. The present process thereby provides a method of economically producing low B.O.D. material suitable for warp sizing in the textile industry. During recent years the need for such materials has become great due to legislation requiring abatement of stream pollution.

The process of this invention is further illustrated by the following examples.

Example 1

Unmodified, powdered corn starch containing 5% moisture was suspended in acetone in a 40% solids concentration. An aqueous 15% sodium hydroxide solution containing 2.5% NaOH based on starch solids was slowly added to the vigorously agitated suspension. Ethylene oxide was added incrementially and the suspension was agitated in a closed, gas-tight vessel at 120° F. The ethylene oxide additions were continued until a purified sample of the product analyzed 38% by weight hydroxyethyl groups by the modified alkoxyl procedure of P. W. Morgan which is described in "Industrial and Engineering Chemistry"; Analytical edition, vol. 18, p. 500 (1946). This is approximately 2.2 hydroxyethyl groups per anhydroglucose group. During the reaction additional acetone was added as needed to keep the suspension in a fluid, stirrable state.

The suspension was neutralized with acid, filtered on a suction filter to remove acetone, and dried. The product was obtained in the form of a white powder consisting of hydroxyethyl starch in the ungelatinized, native granule form. The product gelatinizes instantly when added to cold water and forms a translucent, cohesive, non-gelling paste.

Example 2

Powdered, unmodified potato starch containing 12.5% moisture was suspended in acetone in a 40% solids concentration. An aqueous 15% sodium hydroxide solution containing 2.5% NaOH based on starch solids was slowly added to the vigorously stirred suspension. An additional 6.3% by weight of water based on starch solids was added. Thirty percent by weight of propylene oxide based on starch solids was added and the suspension was agitated in a closed vessel for 66 hours at 120° F. The suspension was then neutralized with phosphoric acid, filtered on a suction filter, and the filter cake was washed thoroughly with acetone. The excess moisture and acetone were removed by vacuum drying at 212° F. The product when weighed showed an increase in organic weight of 19%. This is approximately .52 hydroxypropyl group per anhydroglucose group. The product was obtained in the form of a white powder consisting of hydroxypropyl starch in the ungelatinized, native granule form. It gelatinized instantly when added to cold water and formed a translucent, cohesive, non-gelling paste.

Example 3

A commercial corn starch (10% moisture) produced from a high amylose hybrid corn and containing approximately 55% amylose was suspended in acetone in a 36% solids concentration. An aqueous 30% sodium hydroxide solution containing 2.0% NaOH based on starch solids was slowly added to the vigorously agitated suspension. An additional 5.5% water based on starch solids was added. Ethyleneoxide was added incrementially and the suspension was agitated at 125° F. in a closed vessel until a purified sample of the product analyzed 35.5% hydroxyethyl groups. This is approximately 2.0 hydroxyethyl groups per anhydroglucose group. The suspension was neutralized with acid, filtered on a suction filter to remove acetone, and dried. The product was obtained in the form of a white powder consisting of hydroxyethyl starch in the ungelatinized, native granule form. The product gelatinizes instantly when mixed with cold water and forms a translucent non-gelatinized paste which dried to fairly clear, smooth, and flexible films.

Example 4

Powdered, unmodified corn starch was reacted with 1.2 epoxybutane by the process given in Example 2. The purified product showed an organic weight gain of 12.8%. This is approximately .28 hydroxybutyl group per anhydroglucose group. The product was obtained in the form of a white powder consisting of hydroxybutyl starch in the native, ungelatinized granule form.

Example 5

Powdered, unmodified corn starch was reacted with styrene oxide (epoxyethyl benzene) by the process given in Example 2. The purified product showed an organic weight gain of 9.0%. This is approximately .12 hydroxystyryl group per anhydroglucose group. The product was obtained in the form of white powder consisting of hydroxystyryl starch in the native, ungelatinized granule form.

Example 6

Powdered, unmodified corn starch containing 10% moisture was suspended in methyl ethyl ketone (butanone) in a 40% solids concentration. An aqueous 7.4% sodium hydroxide solution containing 1.5% NaOH based on starch solids was slowly added to the vigorously agitated suspension. Thirty percent by weight of ethylene oxide based on starch solids was added and the suspension was agitated in a closed vessel at 110–120° F. for 63 hours.

The suspension was neutralized with acid, filtered on a suction filter to remove methyl ethyl ketone and dried. A portion which was washed thoroughly with acetone analyzed 23.5% hydroxyethyl group content. This is approximately 1.1 hydroxyethyl groups per anhydroglucose group. The product was obtained in the form of a white powder consisting of hydroxyethyl starch in the native, ungelatinized granule form. It gelatinized instantly in cold water to form a translucent, cohesive, non-gelling paste.

Example 7

Powdered, unmodified corn starch containing 10% moisture was reacted with 30% by weight of ethylene oxide in methyl propyl ketone (2 pentanone) by the procedure described in Example 6. The purified product analyzed 15.7% hydroxyethyl groups. This is approximately .67 hydroxyethyl group per anhydroglucose group. It was obtained in the filterable native, ungelatinized granule form.

Example 8

Powdered, unmodified corn starch containing 10% moisture was reacted with 30% by weight of ethylene oxide in diethyl ketone (3 pentanone) by the procedure described in Example 6. The purified product analyzed 21.4% hydroxyethyl groups. This is approximately 1.0 hydroxyethyl group per anhydroglucose group. It was obtained in the filterable, native, ungelatinized granule form.

Example 9

Powdered, unmodified corn starch containing 5% moisture was suspended in acetone in a 38% solids concentration and 9.7% by weight of sodium hydroxide flakes based on starch was added. The suspension was agitated vigorously and 20% by weight of water based on starch was added slowly. When all of the sodium hydroxide was dissolved, 26% by weight of propargyl bromide based on starch, was added and the suspension agitated in a closed vessel at 115° F. for 24 hours. The suspension was then neutralized with HCl, filtered on a suction filter to remove acetone, and dried. The product was obtained in the form of a white powder consisting of propargyl starch in the ungelatinized, native granule form. The product swelled to a sticky and gummy state when suspended in cold water. The purified product decolorized cold bromine water instantly, thus indicating the presence of unsaturated groups in the starch.

*Example 10*

Powdered, unmodified corn starch was reacted with 19% by weight of diethyl amino ethyl chloride hydrochloride by the procedure given in Example 9. The product was obtained in the form of a white powder consisting of diethyl amino ethyl starch in the ungelatinized, native granule form. The product swelled to a sticky and gummy state when suspended in cold water.

*Example 11*

Powdered, unmodified corn starch containing 10% moisture was suspended in acetone in a 38% solids concentration. An aqueous 40% sodium hydroxide solution containing 17.5% NaOH based on starch solids was slowly added to the vigorously agitated suspension. An additional 13.5% by weight of water based on solids was then added. The suspension was agitated in a closed pressure-tight vessel at 120° F. and methyl chloride gas admitted at a pressure of 12–15 lbs. per square inch for 24 hours. The suspension was then neutralized with HCl, filtered on a suction filter to remove acetone, and the product was dried. The product was obtained in the form of a white powder consisting of methyl starch in the ungelatinized, native granule form. It gelatinized instantly when added to cold water and formed a translucent, cohesive, non-gelling paste.

*Example 12*

Powdered, unmodified corn starch containing 10% moisture was suspended in acetone in a 38% solids concentration and 8% by weight of dry NaOH pellets based on starch was added. The suspension was agitated and 13% by weight of water based on starch solids was slowly added. When all of the NaOH had dissolved 15% by weight of sodium monochloracetate based on starch solids was added and the suspension agitated in a closed vessel at 110° F. for 22 hours. Titration of the remaining alkali indicated that 91% of the sodium chloracetate had been hydrolyzed. The suspension was neutralized with HCl, filtered on a suction filter to remove acetone, and the product dried. The product was obtained in the form of a white powder consisting of sodium carboxymethyl starch in the ungelatinized, native granule form. The product gelatinized instantly when added to cold water and formed a translucent paste with much greater viscosity than pastes of untreated corn starch.

*Example 13*

Powdered, unmodified corn starch containing 10% moisture was suspended in methyl ethyl ketone in a 33% solids concentration and 8% by weight of NaOH pellets based on starch solids was added. The suspension was agitated and an additional 24% by weight of water based on starch solids was slowly added. When the NaOH had dissolved, 15% by weight of sodium monochloracetate based on starch solids was added and the suspension agitated in a closed vessel at 110° F. for 17 hours. Titration of the remaining alkali indicated that 92.6% of the sodium chloracetate had been hydrolyzed. The suspension was neutralized with HCl, filtered on a suction filter to remove acetone and the product dried. The product was obtained in the form of a white powder consisting of sodium carboxymethyl starch in the ungelatinized, native granule form. The product gelatinized instantly when added to cold water and formed a translucent paste with much greater viscosity than pastes of untreated corn starch.

*Example 14*

Powdered, unmodified potato starch containing 12.5% moisture was suspended in methyl ethyl ketone in a 36.5% solids concentration and 2% by weight of NaOH pellets based on starch solids was added. The suspension was agitated and an additional 17.5% by weight of water based on starch solids was slowly added. Forty percent by weight of 3 diethyl amino—1,2 epoxy propane based on starch solids was added and the suspension agitated in a closed vessel at 110° F. for 120 hours. The suspension was neutralized with sufficient HCl to form the hydrochloride, filtered on a suction filter to remove ketone, and dried. The product was obtained in the form of a white powder consisting of the hydrochloride salt of diethyl amino hydroxypropyl starch, in the ungelatinized, native granule form. The product gelatinized instantly when added to cold water and formed a translucent, non-gelling paste.

*Example 15*

Powdered, unmodified corn starch containing 10% moisture was suspended in acetone in a 36% solids concentration. An aqueous 30% sodium hydroxide solution containing 2.5% NaOH based on starch solids was slowly added to the vigorously agitated suspension. An additional 8.0% water based on starch solids was added. Thirty-three percent by weight of acrylamide based on starch solids was added and the suspension agitated in a closed vessel at 110° F. for 144 hours. The suspension was neutralized with acid, filtered on a suction filter to remove acetone, and dried. The product was obtained in the form of a white powder consisting of starch propionamide ether in the native, ungelatinized granule form. The product swelled to a sticky and gummy state when suspended in cold water.

*Example 16*

Powdered, unmodified corn starch containing 10% moisture was suspended in acetone in a 36% solids concentration. An aqueous 10% solution of tetramethyl ammonium hydroxide containing 1% $(CH_3)_4$ NOH based on starch solids was slowly added to the vigorously agitated suspension. Thirty percent by weight of ethylene oxide based on starch solids was added and the suspension agitated in a closed vessel at 110° F. for 44 hours. The suspension was then neutralized with acid, filtered on a suction filter to remove acetone, and dried. A purified sample of the product analyzed 17.2% hydroxyethyl groups. The product was obtained in the form of a white powder consisting of hydroxyethyl starch in the native, ungelatinized granule form. It gelatinizes instantly in cold water to form a translucent, cohesive, non-gelling paste.

One of the advantages of the present process as illustrated by the foregoing examples is that the ketone in the reaction medium is substantially inert under the process conditions. The ketone does not react with the etherifying agent or with the alkali, and thus is conserved throughout the course of the reaction, permitting it to be recovered and re-used without any appreciable loss. Another important advantage of the ketone reaction medium is that the starch, even after reaching a relatively high degree of ether group substitution, remains in the ungelatinized granule state.

The function of the ketone in preventing swelling of the etherified product is very important with regard to commercial production and the properties of the products. Even if the products are to be separated from the suspension by evaporation of the solvent, it is necessary to maintain the ungelatinized granule form, otherwise the product would be in the form of a wet, gummy mass which would be difficult to dry. Such gummy products become extremely hard when dried and are very difficult to grind to a powder. Such gelatinized and dried products have very different paste and film properties than products in the native granule form. A slight degree of swelling of the products can be tolerated in the process without impairing filtrability from the ketone. However, when swelling reaches a certain stage the granules adhere to each other and the product separates out of suspension either as a gummy and sticky mass or forms large gummy lumps. The products may be described as being in the native, ungelatinized granule form. The meaning of "ungelatinized" in this context is that the product is not swollen to the degree that the granules coalesce and form a gummy mass.

While in the foregoing specification this invention has been described in relation to certain specific embodiments thereof, and many details have been set forth for purpose of illustration, it will be apparent to those skilled in the art that the invention is capable of other embodiments and that many of the details described herein can be varied considerably without departing from the basic principles of the invention. For example, it will be apparent to those skilled in the art that the invention can be applied to other amylaceous materials besides starches, although the starches are preferred because of their commercial importance. Among the other amylaceous materials which might be used in the process of the invention are dextrins and cereal flours.

We claim:

1. In the process of producing highly substituted starch ethers in the ungelatinized granule state, the steps comprising forming a suspension of moist alkaline granule starch in an aliphatic ketone selected from the class consisting of acetone and methyl ethyl ketone, said granule starch having intimately associated therewith from 5 to 40% of water based on the dry alkali-free weight of said granule starch, said suspension containing from about 1 to 3 parts by weight of ketone per part of said alkali-free dry starch, introducing into said reaction medium an organic etherifying agent reacting monofunctionally with starch, said etherifying agent providing in excess of .5 ether-forming groups per anhydroglucose unit of said granule starch, reacting said starch with said etherifying agent without gelatinizing said starch until said starch contains in excess of .5 ether group per anhydroglucose unit.

2. The process steps of claim 1 in which said etherifying agent is a mono-epoxy alkane containing less than 4 carbon atoms.

3. The process steps of claim 1 in which said etherifying agent is a mono-halogen substituted alkane containing less than 4 carbon atoms.

4. In the process of producing highly substituted starch ethers in the ungelatinized granule state, the steps comprising forming a suspension of moist alkaline granule starch in an aliphatic ketone selected from the class consisting of acetone and methyl ethyl ketone, said granule starch having intimately associated therewith from 20 to 35 parts by weight of water per 100 parts of dry alkali-free starch, said suspension containing from about 1 to 3 parts by weight of ketone per part of said alkali-free dry starch, introducing into said reaction medium an organic etherifying agent reacting monofunctionally with starch, said etherifying agent providing from at least .9 to 1.6 ether-forming groups per anhydrogluclose unit of said granule starch, reacting said starch with said etherifying agent without gelatinizing said starch, and continuing said reaction until said starch contains from .9 to 1.6 ether groups per anhydroglucose unit.

5. In the process of producing highly substituted starch ethers in the ungelatinized granule state, the steps comprising forming a suspension of moist alkaline granule starch in an aliphatic ketone selected from the class consisting of acetone and methyl ethyl ketone, said granule starch having intimately associated therewith from 5 to 40% of water based on the dry alkali-free weight of the starch, said suspension containing from about 1 to 3 parts by weight of ketone per part of said alkali-free dry starch, introducing into said reaction medium an organic etherifying agent reacting monofunctionally with starch, said etherifying agent providing in excess of .5 ether-forming groups per anhydroglucose unit of said granule starch, reacting said starch with said etherifying agent without gelatinizing said starch, continuing said reaction until said starch contains in excess of .5 ether group per anhydroglucose unit, and separating the etherified starch from the reaction medium by filtration.

6. In the process of producing highly substituted starch ethers in the ungelatinized granule state, the steps comprising forming a suspension of moist alkaline granule starch in an aliphatic ketone selected from the class consisting of acetone and methyl ethyl ketone, said granule starch having intimately associated therewith from 20 to 35 parts by weight of water per 100 parts of dry alkali-free starch, said suspension containing from about 1 to 3 parts by weight of ketone per part of said alkali-free dry starch, introducing into said reaction medium an organic etherifying agent reacting monofunctionally with starch, said etherifying agent providing from at least .9 to 1.6 ether-forming groups per anhydroglucose unit of said granule starch, reacting said starch with said etherifying agent without gelatinizing said starch, continuing said reaction until said starch contains from .9 to 1.6 ether groups per anhydroglucose unit, and separating the etherified starch from the reaction medium by filtration.

7. The method steps of claim 6 in which said ketone is acetone and in which said etherifying agent is ethylene oxide.

References Cited in the file of this patent

UNITED STATES PATENTS

| | | |
|---|---|---|
| 2,635,099 | Talley et al. | Apr. 14, 1953 |
| 2,744,894 | Benedict et al. | May 8, 1956 |
| 2,845,417 | Kesler et al. | July 29, 1958 |